(12) United States Patent
DeVol et al.

(10) Patent No.: US 6,303,936 B1
(45) Date of Patent: Oct. 16, 2001

(54) EXTRACTION-SCINTILLATION MEDIUM AND METHOD OF USE

(75) Inventors: Timothy A. DeVol, Clemson, SC (US); Jonathan M. Duffey, Downers Grove, IL (US); James T. Harvey; Joel M. Williamson, both of Naperville, IL (US); David D. Brown, Glenwood, NY (US); James E. Roane, Pendleton, SC (US)

(73) Assignee: Clemson University, SC (US)

( * ) Notice: Subject to any disclaimer, the term of this patent is extended or adjusted under 35 U.S.C. 154(b) by 0 days.

(21) Appl. No.: 09/190,331

(22) Filed: Nov. 12, 1998

(51) Int. Cl.[7] ....................................................... G01T 1/20
(52) U.S. Cl. ............................................................... 250/364
(58) Field of Search ............................................. 250/364

(56) References Cited

U.S. PATENT DOCUMENTS 4,127,499 * 11/1978 Chen et al. ...................... 252/301.17
4,568,649 * 2/1986 Bertoglio-Matte ................... 436/534
5,346,618 * 9/1994 Horwitz et al. .................... 210/198.2

FOREIGN PATENT DOCUMENTS 1 241 001 * 5/1967 (DE) ..................................... 250/364

* cited by examiner

Primary Examiner—Constantine Hannaher
(74) Attorney, Agent, or Firm—Welsh & Katz, Ltd.

(57) ABSTRACT

An extraction-scintillation medium of substantially free-flowing, porous, solid particulate matter having one or more fluors retained within the particulate matter and an extraction agent adsorbed on or bound to the surface of the particulate matter. The medium is capable of extracting one of a selected radionuclide from an aqueous stream and permits transmission of light therethrough, which light is emitted from the one or more fluors in response to radiation absorbed thereby from the selected radionuclide. A sensor system using the extraction-scintillation medium for real-time or near real-time detection of the selected radionuclide is also disclosed.

17 Claims, 3 Drawing Sheets

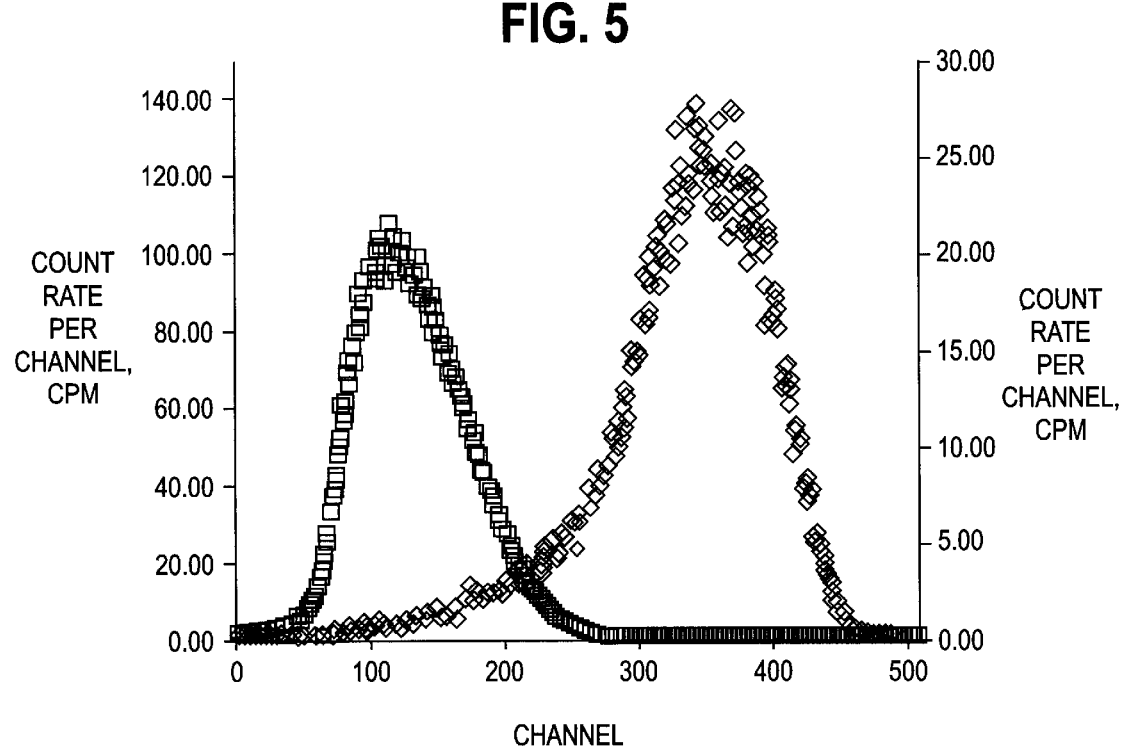

EXTRACTION-SCINTILLATION MEDIUM AND METHOD OF USE

TECHNICAL FIELD

This invention pertains to a dual-purpose extraction-scintillation medium. More particularly, this invention pertains to a substantially free-flowing particulate extraction-scintillation medium and use of the particulate medium in a radiochemical sensor.

BACKGROUND OF THE INVENTION

Facilities, such as, hospitals, universities, research laboratories and nuclear power reactors, that use radioactive material, can have planned or unplanned, continuous or batch discharges of radioactive material to the environment. Much of this material is in the form of a liquid. These releases can result in surface water, ground water and drinking water contamination.

Radiochemical analysis methods are known and used to quantify the level of contamination. Using these methods, the contaminant is either co-precipitated with a carrier or concentrated on an ion-exchange or extraction chromatographic material. In the ion-exchange/extraction chromatography method, the contaminant is eluted from the material and concentrated into a small volume. This concentrated volume of solution is processed for quantification using a radiation sensor.

Advances have been made using extraction chromatography that lowered the sample analysis cost and time necessary for the analysis. However, the extraction chromatography augmented traditional methods are still time consuming and expensive, and do not facilitate real-time on-line analysis.

One alternative to traditional radiochemical methods, is on-line real-time flow monitoring. In one example of such an on-line arrangement, a flow cell sensor for real-time quantification is preceded by the elemental separation of a contaminant through high-performance liquid chromatography. The radioactive effluent is then separately characterized by a flow cell sensor. In this application, the counting time, that is the length of time that the sensor is permitted to count radioactive disintegrations from the material, is quite short, on the order of 20 to 25 seconds. When high-performance liquid chromatography is used to concentrate the contaminant, the resulting detection limit for a 10 milliliter sample of 500 bequerels/liter (Bq/L) for alpha-emitting nuclides, Reboul, et al., *J. Health Physics*, 68:585–89 (1995), and 350 Bq/L for high-energy beta-emitting nuclides was achieved, Reboul, et al., *Radioactivity and Radiochemistry*, 5:42–49 (1994). However, the above technique requires substantial concentration of the contaminant before it can be used for near real-time monitoring, and the separation and detection systems can be quite costly.

Continuous water monitors for effluent monitoring have been developed that quantify the gamma ray-emitting isotopes with a detection limit of about 0.2 Bq/L for a 60 minute counting time, Bronson, et al., *27th Midyear Topical Meeting of the Health Physics Society*, Feb. 13–17, 1994. Two tritium (low-energy beta-emitter) flow cell sensors are known that monitor effluent at the Department of Energy Savanna River Site. The sensors have achievable detection limits, for a 60 minute counting time, of about 750 Bq/L for the heterogeneous flow cell sensor, Hofstetter, et al., Westinghouse Savannah River Co. WSRC-MS-92-163, and about 7 Bq/L for the homogeneous flow cell sensor, Sigg et al., *Nucl. Instr. And Meth. In Phys. Res.*, A353:494–98 (1994).

These effluent monitoring sensors have reasonably low detection limits because a long counting time is used, which is achieved through a physical hold-up system. Although this hold-up system functions well for providing accurate radiation detection, it requires large physical samples to achieve low detection limits. Moreover, requiring long physical or chemical hold-up times prior to quantification is completely counter to the desire to provide on-line, real-time or near real-time detection of effluent stream contamination.

Concentration and quantification of contaminants in an aqueous stream using ion-exchange material has been achieved. Europium-doped calcium fluoride has also been investigated as a dual-purpose sensor material. DeVol, et al., *IEEE Trans. Nucl. Sci.*, Vol. 43, No. 3:1310–15 (1996); Branton, Clemson University, Private Communication (1996). However, high selectivity has not been achieved using this material.

Attempts have also been made to provide an organic extractant on nonporous scintillator supports, such as cerium-doped lithium silicate glass beads, scintillating polyvinyltoluene beads, and the aforementioned europium-doped calcium fluoride crystals. The physical properties of these nonporous media were quite undesirable in that the resulting medium was not in a free-flowing or substantially free-flowing physical form. Rather, these non-porous media were a "sticky" glue-like suspension of the nonporous media in a viscous liquid carrier, which was difficult to handle and created problems in properly packing columns for use.

Accordingly, there exists a need for a dual-purpose extraction-scintillation medium that is highly chemically selective in extraction of the analyte of interest, is in a free-flowing or substantially free-flowing physical form, and is used in a radio-chemical sensor to provide on-line, real-time or near real-time detection of the sorbed analyte. Desirably, such an extraction-scintillation medium further includes the light output characteristics necessary for a successful scintillation medium.

SUMMARY OF THE INVENTION

An extraction-scintillation medium comprises substantially free-flowing, porous, solid particulate matter having one or more fluors retained within the particulate matter and an extraction agent adsorbed on or chemically bound to the surface of the particulate matter.

The medium is capable of extracting one or more selected radionuclides, such as americium, uranium, thorium, plutonium, strontium, technetium, iodine, neptunium or curium from an aqueous stream, and permits transmission of light through the medium, which light is emitted from the scintillator in response to radiation absorbed thereby from the selected radionuclide.

In an extraction-scintillation medium in which the extraction agent is adsorbed on the surface of the particulate matter, the extraction agent can be ionically charged, and preferably has a neutral charge. In an extraction-scintillation medium in which the extraction agent is chemically bound to the particulate matter, the extraction agent can have an ionically negative charge, and preferably has a neutral charge at a pH value of use.

Preferably, the particulate matter is an inert bead resin, and most preferably, the bead resin is cross-linked polystyrene. The inert resin does not react or degrade during assay.

In a contemplated extraction-scintillation medium the scintillator is a mixture of 2,5-diphenyloxazole (PPO) and 1,4-bis(4-methyl-5-phenyloxazol-2-yl)benzene (DM-POPOP) and can include naphthalene. Preferably, the PPO is present in a concentration of about 2 percent to about 20 percent and preferably about 2 percent to about 5 percent by weight of the solid particulate matter and the DM-POPOP is present in a concentration of about 0.3 percent to about 2.6 percent and preferably about 0.3 percent to about 1.0 percent by weight of the solid particulate matter. Naphthalene, if used, is present in a concentration of about 0.5 percent to about 12 percent, and preferably about 0.5 percent by weight of the solid particulate matter.

The extraction agent can be adsorbed on or chemically bound to the surface of the bead resin. In one contemplated extraction-scintillation medium, the extraction agent is alkyl (phenyl)-N-N-dialkylcarbamoylmethylphosphine oxides (CMPO) with a phase modifier such as tri-n-butyl phosphate (TBP) that is adsorbed on the surface of the bead resin. In another contemplated extraction-scintillation medium, the extraction agent is a crown ether, and preferably, bis-4,4'(5') [(t-butyl)cyclohexano]-18-crown-6 (DtBuCH18-C-6) that is adsorbed on the surface of the bead resin.

In yet another contemplated extraction-scintillation medium, the extraction agent is a cross-linked polystyrene-vinyl benzyl (halide) particle having a plurality of covalently bonded $X—(CH_2CH_2O)_n—CH_2CH_2R$ groups that contain at least one poly(oxyethylene) chain $[(—CH_2CH_2O—)_n]$ having an average molecular weight of about 700 to about 10,000, with a molecular weight of about 2,000 to 5,000 more preferred.

One contemplated medium that is non-extracting, is provided as an inert support, such as a polystyrene bead resin or an acrylic bead resin, having a one or more fluors impregnated therein, and is provided without the extraction agent sorbed on or chemically bound thereto. The inert support is one that is useful for the separation or purification of bio-molecules such as proteins, peptides, nucleic acids, antibiotics and other natural products.

The fluor can be 1,4-bis-2-(5-phenyloxazol-2-yl)benzene (POPOP), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2-(4-biphenylyl)-6-phenylbenzoxazole (PBBO), 2-(1-napthyl)-5-phenyloxazole (α-NPO), 1,4-bis(2-methylstyryl)benzene (bis-MSB), 2,5-bis(5-tert-butyl-2-benzoxazolyl)thiophene (BBOT), anthracene, stilbene, p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), and 7,7-diphenyl-9,9,9', 9'-tetrapropy-2,2'-bifluorene ($PF_2$) and naphthalene. Preferably, the fluors are a mixture of 2,5-diphenyloxazole (PPO) and 1,4-bis(4-methyl-5-phenyloxazol-2-yl)benzene (DM-POPOP). The preferred scintillator can include naphthalene. Such a scintillation medium is useful in separating or purifying, and quantifying such bio-molecules that have been labeled with a radio-isotope.

A detector for providing real-time or near real-time retention and counting of a selected radionuclide from an aqueous stream includes a flow cell and an extraction-scintillation medium disposed in the flow cell. The scintillation-extraction medium is free-flowing or substantially free-flowing, porous, solid particulate matter having one or more fluors retained within the particulate matter and an extraction agent disposed on the surface of the particulate matter. The extraction agent can be absorbed on the surface of the particulate matter or chemically bound to the particulate matter.

The medium is capable of extracting the selected radionuclide from the aqueous stream and permits transmission of light through the medium, which light is emitted from the scintillator in response to radiation absorbed thereby from the selected radionuclide. The detector includes means for detecting the light emitted from the scintillator.

In a contemplated detector, the light detecting means includes at least one, and preferably a pair of photomultiplier tubes positioned adjacent the flow cell. The photomultiplier tubes sense light emitted from the extraction-scintillation medium and generate an electrical signal in response thereto. A recording apparatus is operably connected to the at least one photomultiplier tube for recording the electrical signal generated thereby.

Other features and advantages of the present invention will be apparent from the following detailed description, the accompanying drawings, and the appended claims.

BRIEF DESCRIPTION OF THE FIGURES

In the figures forming a portion of this disclosure,

FIG. 5 is a graphic illustration of the pulse height spectra for off-line analysis for an extraction-scintillation media having a technetium/iodine-selective extraction agent represented by the data shown as open squares, and an extraction-scintillation media having an actinide-selective extraction agent represented by the data shown as open diamonds, the data being shown as the count rate in counts per minute per channel on the left-hand ordinate for the technetium/iodine-selective media and on the right-hand ordinate for the actinide-selective media, as a function of the multichannel analyzer channel number shown on the abscissa.

DETAILED DESCRIPTION OF THE PREFERRED EMBODIMENTS

Figure 1:
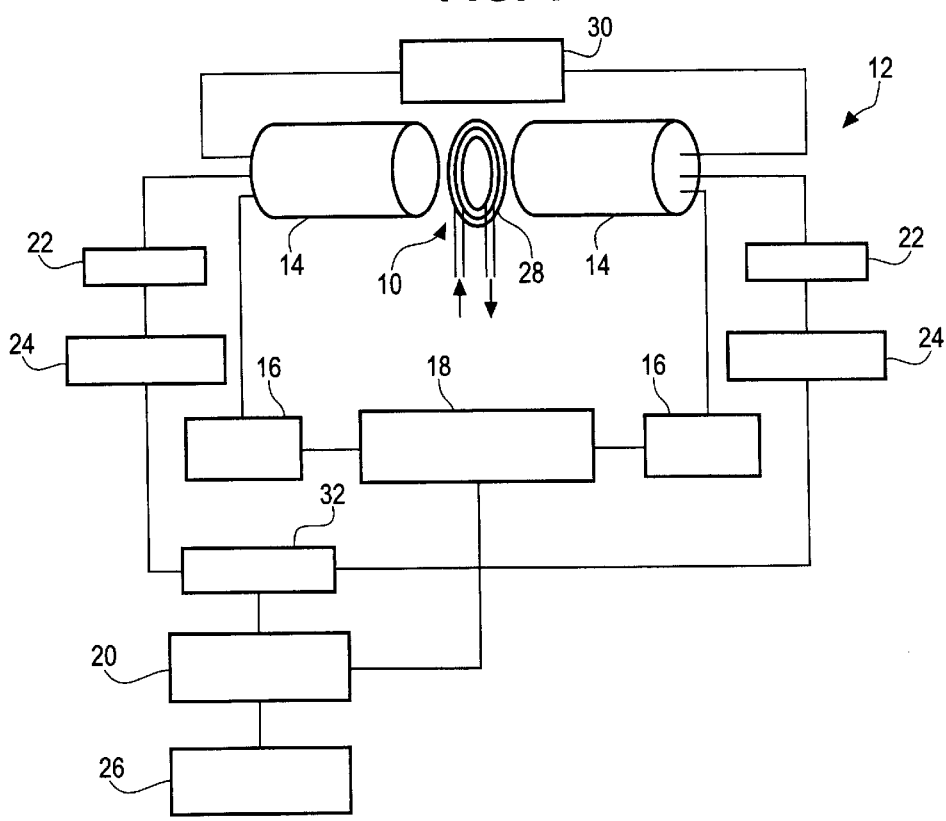
FIG. 1 is a schematic illustration of an exemplary radiochemical sensor in accordance with the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

An extraction-scintillation medium comprises free-flowing or substantially free-flowing, porous, solid particulate matter having one or more fluors retained within the particulate matter and an extraction agent adsorbed on or chemically bound to the surface of the particulate matter. The medium is capable of selectively extracting a radionuclide, such as americium, uranium, thorium, plutonium, strontium, technetium, iodine, neptunium or curium from an aqueous stream. The medium permits transmission of light through the medium, which light is emitted from the scintillator in response to radiation absorbed thereby from the selectively extracted radionuclide.

Preferably, the extraction-scintillation medium is formed from an inert bead resin having the one or more fluors retained within the bead resin and the extraction agent adsorbed on or chemically bound to the surface of the resin. The bead resin is inert to the extent that it does not react or degrade during an assay. Most preferably, the bead resin is a cross-linked polystyrene resin.

In a preferred extraction-scintillation medium, the scintillator is a mixture of 2,5-diphenyloxazole (PPO) and 1,4-bis(4-methyl-5-phenyloxazol-2-yl)benzene (DM-POPOP) and can include naphthalene. Preferably, the PPO is present in a concentration of about 2 percent to about 20 percent and preferably about 2 percent to about 5 percent by weight of the solid particulate matter and the DM-POPOP is present in a concentration of about 0.3 percent to about 2.6 percent and preferably about 0.3 percent to about 1.0 percent by weight of the solid particulate matter. Naphthalene, if used, is present in a concentration of about 0.5 percent to about 12 percent, and preferably about 0.5 percent by weight of the solid particulate matter.

The extraction agent can be adsorbed on or chemically bound to the surface of the resin. In one contemplated extraction-scintillation medium, the extraction agent is a crown ether that is adsorbed on the surface of the resin bead, and is capable of selectively extracting strontium. A preferred crown ether is bis-4,4'(5')[(t-butyl)cyclohexano]-18-crown-6 (DtBuCH18-C-6). In another contemplated extraction-scintillation medium, the extraction agent is alkyl (phenyl)-N-N-dialkylcarbamoylmethylphosphine oxides (CMPO) with a phase modifier such as tri-n-butyl phosphate (TBP) that is adsorbed on the surface of the bead resin and is capable of selectively extracting actinide metals, and particularly those in the, tri-, quadra- and hexavalent states, such as americium, curium, uranium, thorium, neptunium and plutonium.

One contemplated medium is provided as an inert support, such as a polystyrene bead resin or an acrylic bead resin, having one or more fluors impregnated therein, and is provided without the extraction agent sorbed on or chemically bound thereto. The inert support is one that is useful for the separation or purification of bio-molecules such as proteins, peptides, nucleic acids, antibiotics and other natural products. Such a scintillation medium is particularly useful in separating or purifying, and quantifying such bio-molecules that have been labeled with a radio-isotope.

In use, the present extraction-scintillation medium is used in a flow cell 10 in a detector or sensor system 12 to measure or determine the radioactivity in a sample, such as an aqueous stream. An exemplary sensor system 12 is schematically illustrated in FIG. 1. DeVol et al., *IEEE Trans. Nucl. Sci.*, Vol. 43, No. 3, 1310:1315 (1996). Advantageously, use of a contemplated extraction-scintillation medium in a flow cell 10 permits real-time, or near real-time determination of radioactive contamination levels in a flowing stream, without chemical or physical hold-up of the stream, and with hold-up of substantially only the analyte of interest.

Referring to FIG. 1, the exemplary detector 12 includes the flow cell 10 positioned between a pair of photomultiplier tubes (PMTs) 14. One output from the PMTs 14, which is used for timing, is fed to a constant fraction discriminator 16 that generates a timing signal. The timing signal is then fed to a time-to-amplitude converter (TAC) 18 and the resulting signal is used to gate the pulse height analog-to-digital converter (ADC) 20. A second output from the PMTs, a pulse height output, is fed to a scintillation pre-amplifier 22 and an amplifier 24. The amplified signals are summed by a sum amplifier 32 and fed to the pulse height ADC 20 where the signals are recorded for analysis on, for example, a computer 26.

A presently contemplated extraction-scintillation medium is comprised of free-flowing or substantially free-flowing particulate matter that has the one or more fluors retained within the particles and the extraction agent adsorbed or chemically bound to the surface of the particles. Preferably, the particulate matter provides a substrate for the one or more fluors and the extraction agent, and is porous and/or is formed having voids within the bodies of the particles. The one or more fluors is retained within the body and/or the pores of the particles, and the extraction agent is chemically bound to the surface or adsorbed on the surface of the particle, including the surface of the pores.

In a particularly preferred form, the substrate includes porous beads, such as bead resins. Preferably, the bead resin is an inert, organic polymer, such as an acrylic bead resin having at least 80 percent particles in a range of about 100 $\mu$m ($100 \times 10^{-6}$ m) to about 150 $\mu$m with no more than about 10 percent less than about 100 $\mu$m, and having a surface area of at least about 450 to 650 square meters per gram ($m^2/g$) of dry medium and a porosity of about 0.50 to 0.70 cubic centimeters per cubic centimeter (cc/cc). One such resin is commercially available from TosoHaas of Montgomeryville, Pa. under the tradename Amberchrom® CG-71t2. Those skilled in the art will recognize that such an inert bead resin does not react with either the aqueous stream or the radionuclides carried thereby, and does not degrade during an assay.

Most preferably, the substrate is a cross-linked polystyrene bead resin having at least 80 percent particles in a range of about 80 $\mu$m to 160 $\mu$m, and having a surface area of at least about 750 to 1000 square meters per gram ($m^2/g$) of dry medium and a porosity of about 0.55 to 0.75 cubic centimeters per cubic centimeter (cc/cc). One such resin is commercially available from TosoHaas of Montgomeryville, Pa. under the tradename Amberchrom® CG-161cd.

Various fluors can be used for a contemplated extraction-scintillation medium, such as a mixture of 2,5-diphenyloxazole (PPO) and 1,4-bis(4-methyl-5-phenyloxazol-2-yl)benzene (DM-POPOP). Other fluors can also be used, such as 1,4-bis-2-(5-phenyloxazol-2-yl) benzene (POPOP), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2-(4-biphenylyl)-6-phenylbenzoxazole (PBBO), 2-(1-napthyl)-5-phenyloxazole (α-NPO), 1,4-bis(2-methylstyryl)benzene (bis-MSB), 2,5-bis(5-tert-butyl-2-benzoxazolyl)thiophene (BBOT), anthracene, stilbene, p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), and 7,7-diphenyl-9,9,9', 9'-tetrapropy-2,2'-bifluorene ($PF_2$) and naphthalene.

The fluors are retained within each of the particles. Those skilled in the art will understand that the precise phenomena or mechanism by which the fluor is retained within the particles can be described in various manners. While not wanting to be bound by theory, it is believed that the fluors are retained in either or both of the body (matrix) and the pores of the particles. For example, the above-noted organic bead resin can be formed from long-chain polymer molecules bound to one another along the length of the molecular chains. These bead resins are recognized as defining pores within the body of the resin beads. In such an instance, the fluors can be retained within the molecular structure "between" the polymer chains, or the fluors can be retained within the pores within the body of the resin, thus constituting the scintillator.

In either instance, it is also recognized that the fluors must be retained within the particles so that the resulting scintillator can be subjected to radiation exposure from the radionuclide extracted from the aqueous solution, and can in turn emit energy, in the form of light as a result of the radiation exposure. It will thus be apparent from the present description that the particles be capable of permitting the transmission of light emitted from the scintillator.

The extraction agent, if used, can also vary depending upon the specific radionuclide selected for extraction. Some contemplated extraction agents are adsorbed on the particles in a substantially surface-exhibited phenomena, and other extraction agents are bound to the particles, such as by chemical bonding. The extraction agents can be neutral, that is non-ionically charged at the pH value of use, or can be ionically charged.

For example, a group of neutral bifunctional organophosphorous compounds broadly described as alkyl(phenyl)-N-N-dialkylcarbamoylmethylphosphine oxides (CMPO) with a phase modifier such as tri-n-butyl phosphate (TBP) is useful for extracting actinide and lanthanide radionuclides from acidic solutions containing these metals. CMPO is an ionic charge-neutral agent that is adsorbed on the surface of the particulate bead resin. A preferred CMPO is octyl (phenyl)N,N-disobutyl-carbamoylmethylphosphine oxide dissolved in a diluent of TBP, preferably in a concentration of about 0.75 M. A detailed description of this extractant is provided in U.S. Pat. No. 4,574,072 and No. 4,835,107 to Horwitz et al., the disclosures of which are each incorporated herein by reference.

Another ionic charge-neutral, surface adsorbed extraction agent that is useful in the extraction of strontium from an aqueous solution is a dicyclohexano crown ether, such as dicyclohexano 18-crown-6, dicyclohexano 21-crown-7, and dicyclohexano 24-crown-8, and preferably, 4,4'(5') [(R,R') dicyclohexano]-18-crown-6, where R and R' are one or more members selected from the group of H and straight chain or branched alkyls containing 1 to 12 carbon atoms. A most preferred crown ether is bis-4,4'(5')[(t-butyl)cyclohexano]-18-crown-6 (DtBuCH18-C-6). These crown ethers have been observed to be particularly useful in the extraction of strontium when used in a concentration of about 0.1 to 0.5 M, and preferably about 0.2 M in a diluent of 1-octanol when the t-butyl form of the crown ether is used, and a concentration of about 0.25 to 0.5 M when the hydrogen form is used. A more detailed discussion of these crown ethers and their use as extraction agents is provided in U.S. Pat. No. 5,100,585 and No. 5,346,618, both to Horwitz et al., the disclosures of which are each incorporated herein by reference. An extraction agent in accordance with these properties is available from Eichrom Industries, Inc. of Darien, Illinois under the tradename Sr Resin.

Still another extraction agent that is useful in a contemplated extraction-scintillation medium, and particularly useful for the selective extraction of thorium, plutonium, uranium and americium, is a resin formed from a negatively charged, chemically bonded diphosphonic acid-based extractant, and preferably, a vinylidene or methylene diphosphonic acid-based resin. These resins are more fully described in U.S. Pat. No. 5,256,808 to Alexandratos, U.S. Pat. No. 5,281,631 to Horwitz et al., and U.S. Pat. No. 5,618,851 to Trochimcznk et al., the disclosures of which are each incorporated herein by reference. Exemplary of such resins are those available under the tradename Diphonix® from the aforementioned Eichrom Industries.

Still another extractant that is particularly useful for the extraction of technetium and iodine, is one that is a cross-linked polystyrene-vinyl benzyl (halide) particle having a plurality of covalently bonded X—$(CH_2CH_2O)_n$—$CH_2CH_2R$ groups that contain at least one poly (oxyethylene) chain [(—$CH_2CH_2O$—)$_n$] having an average molecular weight of about 700 to about 10,000, with a molecular weight of about 2,000 to 5,000 more preferred. More specifically, the extractant corresponds to the formula X—$(CH_2CH_2O)_n$—$CH_2CH_2R$, where n is the number of ethyleneoxy repeating units, and is a number having an average value of about 15 to 225, and more preferably about 40 to 130. R is a terminal group selected from the group of —OH, $C_1$–$C_{10}$ hydrocarbyl ether (alkoxy group) having a molecular weight of up to about one-tenth of the —$(CH_2CH_2O)_n$—portion, carboxylate, sulfonate, phosphonate and —$NR^1R^2$ groups, where each of $R^1$ and $R^2$ is independently hydrogen, $C_1$–$C_6$ alkyl or $C_2$–$C_3$ hydroxyalkyl or —$NR^1R^2$ together form a 5- or 6- membered cyclic amine having a zero or one oxygen atom or zero or one additional nitrogen atom in the ring. X can be O, S, NH, or N—$(CH_2CH_2O)_m$—$R^3$, and is preferably O. A more detailed discussion of this form of extractant is provided in U.S. Pat. No. 5,603,834 and U.S. Pat. No. 5,707,525 to Rogers et al., the disclosures of which are each incorporated herein by reference. Exemplary of a resin having this form of extractant bound thereto is ABEC® brand resin, commercially available from the above-mentioned Eichrom Industries. It has been observed that ABEC® resin, which has a substantially free-flowing physical form is most easily disposed; e.g., packed into a column, using a wet packing technique, in which the resin is slurried, in an aqueous stream, into the column.

Still another extraction agent is a diesterified methanediphosphonic acid, and preferably bis(2-ethylhexyl) methanediphosphonic acid in a diluent of methanol. This extractant is useful in the extraction of actinide and lanthanide metals, and particularly those actinide and lanthanide metals in the tri-, tetra-and hexavalent oxidation states. The extractant is adsorbed on the particles and is neutrally charged at the pH value of use (low pH values) and negatively charged at higher pH values. In a typical arrangement in which the extraction-scintillation medium is used, the extractant will be present as neutrally charged. A more detailed discussion of this extractant and a resin made using this extractant is provided in U.S. Pat. No. 5,651,883 to Horwitz et al., the disclosure of which is incorporated herein by reference. A resin having this extractant adsorbed thereon is commercially available from the above-noted Eichrom Industries under the tradename Dipex®.

A contemplated extraction-scintillation medium is made in a variety of processes. In one such process, referred to as a two-step process, a particulate bead resin is first impregnated with the one or more fluors and subsequently impregnated or coated with the extraction agent. In first preparing the scintillator in this manner, PPO and DM-POPOP are added to 250 mL of toluene (as a solvent) and stirred until dissolved. In those media in which naphthalene is added as a constituent of the scintillator, the naphthalene is also added at this time.

The toluene-fluors mixture is admixed with a predetermined amount of bead resin and is placed in a rotary evaporator for mixing for about 12 hours. The solvent (toluene) is then evaporated from the mixture at elevated temperature and reduced pressure (about 60° C. and 29 inches Hg). Because toluene has a relatively high boiling point, about 1100° C., some toluene remains, however, the resulting fluors-impregnated bead resin is a free-flowing or substantially free-flowing product.

Following impregnation with the fluors, the free-flowing or substantially free-flowing product is impregnated (coated) with the extraction agent. Three separate extraction agents were used to prepare three different extraction-scintillation media. The three extraction agents are DtBuCH18-C-6 (in 1-octanol), undiluted bis(2-ethylhexyl)methane-diphosphonic acid, and 0.75 M CMPO in TBP.

In the preparation of each of these media, the extractant/diluent solution is dissolved in methanol(in the case of bis(2-ethylhexyl)methane-diphosphonic acid, the extractant is dissolved in isopropanol), and is added to the fluors-impregnated bead resin in a rotary evaporator and stirred for about one hour. The methanol (or isopropanol) is evaporated from the resin by distillation at elevated temperature and reduced pressure (about 500° C. and 29 inches Hg). Any toluene that remains in the fluors-impregnated bead resin is removed as an azeotrope with the methanol. The resin is dried on the rotary evaporator until the weight of the resin is about equal to or less than the expected final weight (weight of the bead resin support plus the weight of the fluors plus the weight of the extraction agent plus the weight of the diluent).

In another process, referred to as a one-step process, the fluors impregnation step and the extraction agent coating/impregnation step are carried out simultaneously, and the toluene and methanol (isopropanol) are evaporated from the resin simultaneously in a rotary evaporator.

One contemplated medium that is non-extracting, is provided as an inert support, such as a polystyrene bead resin or an acrylic bead resin, having one or more fluors impregnated therein, and is provided without the extraction agent sorbed on or chemically bound thereto. The inert support is one that is useful for the separation or purification of bio-molecules such as proteins, peptides, nucleic acids, antibiotics and other natural products. Such a scintillation medium is particularly useful in separating or purifying, and quantifying such bio-molecules that have been labeled with a radio-isotope Contemplated supports for this medium include the above-noted Amberchrom® CG-71t2 and CG-161cd, commercially available from TosoHaas. Those skilled in the art will recognize that other acrylic and polystyrene resins, as well as other organic and inorganic supports having a variety of average particle and pore sizes can be used as a substrate or support for this medium.

Fluors for this medium include 1,4-bis-2-(5-phenyloxazol-2-yl)benzene (POPOP), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2-(4-biphenylyl)-6-phenylbenzoxazole (PBBO), 2-(l-napthyl)-5-phenyloxazole (α-NPO), 1,4-bis(2-methylstyryl)benzene (bis-MSB), 2,5-bis(5-tert-butyl-2-benzoxazolyl)thiophene (BBOT), anthracene, stilbene, p-terphenyl, 2,7-diphenyl-9, 9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), and 7,7-diphenyl-9,9,9', 9'-tetrapropy-2,2'-bifluorene ($PF_2$) and naphthalene. Preferably, the scintillator is a mixture of 2,5-diphenyloxazole (PPO) and 1,4-bis(4-methyl-5-phenyloxazol-2-yl)benzene (DM-POPOP). The preferred scintillator can include naphthalene.

Illustrated in FIG. 1 is one radiochemical sensor system 12 or scintillation detector that uses the extraction-scintillation medium to provide on-line, real-time or near real-time monitoring of aqueous streams for selective radionuclides, without large quantity chemical or physical hold-up of the aqueous sample. Such a sensor system 12 is particularly useful, for example, in monitoring effluent streams from facilities, such as hospitals, nuclear power facilities, and research laboratories that use radioactive materials. It is also particularly useful for on-line, real-time monitoring of ground water and surface water at or near these or other suspect facilities.

The exemplary sensor system 12 includes a flow cell 10 having the extraction-scintillation medium therein. The medium is retained in the flow cell 10, much like a common bead resin is retained within an extraction or ion exchange column, such as in a section of glass or polytetrafluoroethylene (PTFE) tubing 28, by screens or other retaining means (not shown) supporting the medium within the cell 10. Typically, the flow cell 10 volume is maintained at a relatively small liquid volume, about 2 milliliters (mL). The relatively small volume results in a short residence time, and thus a short counting time, which is advantageous over and unlike traditional methods that use a relatively long counting time for accurate radionuclide detection.

Unlike known sensors or detectors, a contemplated sensor 12 that includes the present extraction-scintillation medium provides for selective retention of the radionuclides that it is desired to "count" without retention of large samples of the aqueous stream. This is particularly advantageous when the concentration of the radionuclide sought to be detected is low, and traditional methods would require relatively large hold-up quantities. A contemplated detector 12 has been found to provide real-time or near real-time, on-line quantification of radionuclides in aqueous streams at levels of about 0.5 Bq/L. When compared to known, currently used "one-pass" flow cell system quantification levels of about 500 Bq/L, a sensor 12 using a contemplated extraction-scintillation medium can produce quantification level results that are one-thousandth of those for the currently used "one-pass" flow cell systems. As will be understood by those skilled in the art, these order of magnitude differences in quantification or detection levels reduce the sample concentration needed for accurate measurement of the radionuclide contaminants in a given stream. It will also be recognized that the amount of activity that is needed by the detector for quantification is constant; e.g., the same minimum detectable activity, however, the present system retains substantially only the analyte of interest until this minimum detectable activity is reached.

A sensor or flow cell detection system 12 includes a flow cell 10 and means for detecting light that is emitted from the fluors in the extraction-scintillation media in response to absorption of energy from the radionuclide. One such system is that illustrated in FIG. 1 that was used to acquire the flow-cell pulse height distribution or energy spectrum of various samples of the extraction-scintillation medium. The extraction-scintillation medium was retained in a flow cell 10 positioned between a pair of photomultiplier tubes (PMTs) 14. A high voltage source 30 of about −1500V to about −1200V provided an electrical potential across the PMTs 14. One output from the PMTs was used for timing, and was fed to a constant fraction discriminator 16 that generated a timing signal. The timing signal was then fed to a time-to-amplitude converter (TAC) 18 and the resulting signal was used to gate the pulse height analog-to-digital converter (ADC) 20. A second output from the PMTs 14, a pulse height output, was fed to a scintillation pre-amplifier 22 and an amplifier 24. The amplified signals were summed by a sum amplifier 32 and fed to the pulse height ADC 20 where the signals were recorded for analysis on a computer 26.

Studies were conducted to determine the detection efficiency, loading efficiency and recovery efficiency of various radionuclides using different contemplated extraction-scintillation media in flow cell sensors. The physical apparatus included the exemplary flow cell sensor system 12 having a flow cell 10 that was formed from ⅛ inch outside diameter, 1/16 inch inside diameter Teflon tubing 28 coiled to a one inch diameter, packed with a contemplated extraction-scintillation medium having a pore volume of about 0.2 mL.

The flow cell 10 was positioned between a pair of Hamamatsu R292 photomultiplier tubes (PMTs) 14 that were separated by 1 cm. The anode from the PMTs was grounded through a 50 ohm (Ω) resistor and used for timing. A timing signal was generated by an Ortec 935 constant fraction discriminator (CFD) 16 and fed to an Ortec 567 time-to-amplitude converter (TAC) 18. The TAC 18 range was set to 50 nanoseconds (ns) and the output gated the pulse height input to an analog-to-digital converter (ADC) 20 or multichannel analyzer, having an Aptec MCA card.

The pulse height signal was acquired from a dynode on the PMTs 14 and had a $10^6$ Ω load resistor. The pulse height signals were fed to Ortec 113 scintillation preamplifiers 22 and to Canberra 2021 amplifiers 24 with 3 μsec shaping times. The unipolar outputs from the amplifiers 24 were fed to an Ortec 533 sum amplifier 32 which was output to the pulse height ADC 20, and the resulting data was stored on the personal computer 26.

Resins were prepared in which the support; e.g., the inert bead resin particles, the extractant and fluors and their concentrations were varied. Table 1, below, lists the various resin samples that were studied.

TABLE 1

EXTRACTION-SCINTILLATION MEDIA FORMULATIONS

| Media Sample No. | Support | Extractant/ Diluent | Support (g) | PPO (g) | DM-POPOP (g) | Naphthalene (g) |
|---|---|---|---|---|---|---|
| TRU 1 | acrylic | CMPO/TBP | 30.00 | 7.500 | ~1 | |
| TRU 2 | acrylic | CMPO/TBP | 30.00 | 3.750 | 0.500 | |
| TRU 3 | acrylic | CMPO/TBP | 30.00 | 0.750 | 0.100 | |
| TRU 4 | acrylic | CMPO/TBP | 30.00 | 0.375 | 0.050 | |
| TRU 5 | acrylic | CMPO/TBP | 30.00 | 0.150 | 0.020 | |
| TRU 6 | acrylic | CMPO/TBP | 30.00 | 0.750 | 0.100 | 0.162 |
| TRU 7 | acrylic | CMPO/TBP | 30.00 | 0.750 | 0.100 | 0.324 |
| TRU 8 | acrylic | CMPO/TBP | 30.00 | 0.750 | 0.100 | 0.810 |
| TRU 9 | acrylic | CMPO/TBP | 30.00 | 0.750 | 0.100 | 4.050 |
| TRU 10 | PS | CMPO/TBP | 24.81 | 0.620 | 0.083 | |

TABLE 1-continued

EXTRACTION-SCINTILLATION MEDIA FORMULATIONS

| Media Sample No. | Support | Extractant/ Diluent | Support (g) | PPO (g) | DM-POPOP (g) | Naphthalene (g) |
|---|---|---|---|---|---|---|
| Sr1 | acrylic | DtBuCH18C6/ 1-Octanol | 31.26 | 0.750 | 0.100 | |
| Sr2 | PS | DtBuCH18C6/ 1-Octanol | 31.25 | 0.750 | 0.100 | |
| New Sr2 | PS | Proprietary | 37.50 | 0.750 | 0.100 | |

Solutions were prepared containing thorium-230 (Th-230), natural uranium (Nat. U), depleted uranium (U-238), uranium-233 (U-233), americium-241 (Am-241) and strontium-90 (Sr-90) for conducting these studies. The Th-230, nat. U, U-238, U-233 and Am-241 solutions were prepared in 2.0M $HNO_3$ and the Sr-90 solution was prepared in 8.0M $HNO_3$. The solutions were used in concentrations of about 10 Bq/L to 100 Bq/L. Typical loading volumes onto the flow cell were about 0.1 mL to 1.0 mL.

The flow cell 10 was loaded into the system 12, and the PMT 14 high voltage supply 30 was set to -1500V. The flow cell 10 was conditioned with 50 pore volumes of an acid solution that was the same as that that carried the radionuclide; e.g., for the studies for Am-241, which was carried in 2.0M $HNO_3$, the flow cell 10 was first conditioned with a solution of 2.0M $HNO_3$, at a flow rate of about 0.5 mL/min. The data acquisition was started in multichannel scaling mode with 100 second dwell times and the multichannel scaling recorded the detector counts repeatedly in 100-second intervals.

The radionuclide was then loaded onto the flow cell 10 in its acid solution, with five pore volumes. Following loading, the flow cell 10 was washed with an acid solution (at the same concentration as the acid solution in which the radionuclide was carried; e.g., 2M $HNO_3$ wash solution for the Am-241 studies) for 25 to 75 pore volumes and the loading effluent; i.e., the wash solution, was reserved for analysis. The multichannel scaling spectrum of the column conditioning, loading and washing was saved on the computer for later analysis.

A pulse height spectrum of the flow cell was recorded. The multichannel acquisition commenced and several minutes of data were acquired before elution of the flow cell. The radionuclide from the flow cell was eluted using 0.05M $HNO_3$ or 0.05M $HNO_3$ with 0.01M oxalic acid and the elution effluent was reserved for later analysis. The multichannel elution spectrum was saved on the computer for later analysis. Aliquots of the loading and elution effluent were counted on a liquid scintillation counter to determine loading efficiency and total recovery, respectively.

The results of these performance studies for some of the extraction-scintillation media are provided in Table 2, below.

TABLE 2

PERFORMANCE COMPARISON OF VARIOUS EXTRACTION-SCINTILLATION MEDIA

| Media Sample No. | Support | Extractant/ Diluent | Radio-nuclide | Detection Efficiency (%) | Loading Efficiency (%) | Recovery (%) |
|---|---|---|---|---|---|---|
| TRU 1 | Acrylic | CMPO/TBP | Am-241 | 19[1] | 100 | 100 |
| TRU 3 | Acrylic | CMPO/TBP | Am-241 | 25[1] |  | 98 |
| TRU 3 | Acrylic | CMPO/TBP | Am-241 | 62 |  | 98 |
| TRU 10 | PS | CMPO/TBP | Am-241 | 100 | 100 | 100 |
| TRU 10 | PS | CMPO/TBP | Nat U | 70[2] | 100 | 97 |
| TRU 10 | PS | CMPO/TBP | Th-230 | 82 |  |  |
| TRU 10 | PS | CMPO/TBP | U-233 | 91 | 99.2 | 93.6 |
| New Sr2 | PS | Proprietary | Sr-90 | ~30 | 100 |  |

[1]PMT at −1200 V, other efficiency values are calculated at −1500 V.
[2]Average detection efficiency U-234 and U-238.

As can be seen from the data presented in Table 2, the detection efficiency of the extraction-scintillation media for radionuclides is high, and is particularly high for these radionuclides when the media is a polystyrene-supported resin having a CMPO extractant adsorbed thereon. Likewise, the loading efficiency and percent recovery of the radionuclides are also quite high for this resin.

Figure 2:
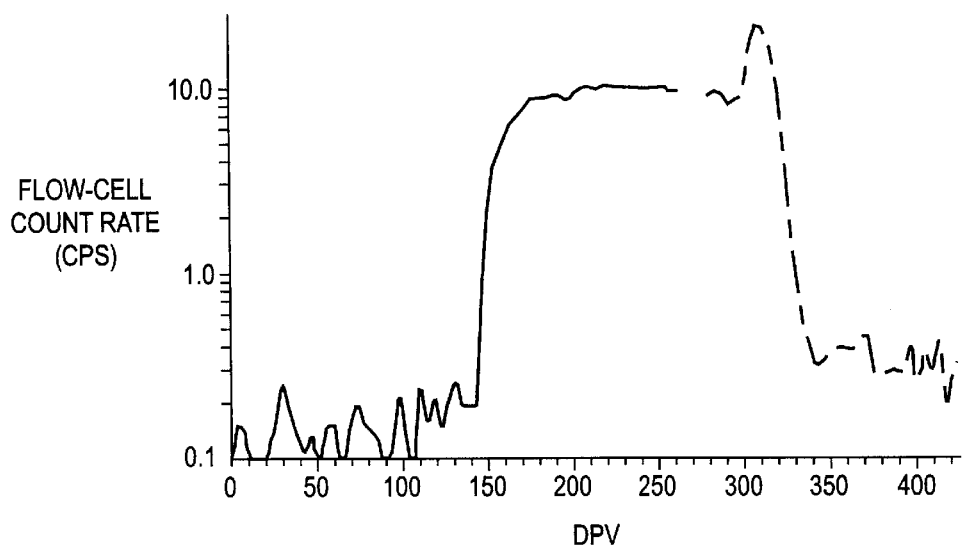
FIG. 2 is a graphic illustration of the multichannel scaling of loading and elution of Am-241 in a flow cell having an extraction-scintillation medium therein, illustrated as the flow cell count rate in counts per second (cps) as a function of the displaced pore volume (DPV), where the loading of the Am-241 is illustrated as a solid line and the elution of the Am-241 is shown as a broken line.

FIG. 2 is a multichannel scaling plot of the flow cell count rate, in counts per second (CPS) as a function of the displaced pore volume of the radionuclide solution in the flow cell during loading 5 and elution. This plot was developed using a flow cell having an acrylic bead resin support and an extractant of CMPO in TBP and includes the extraction agent and fluors in concentrations represented by sample TRU1 of Table 1.

Loading of the flow cell was conducted as a finite step of about 5 displaced pore volumes, and is indicated in FIG. 2 as a sharp, almost step-like increase in the count rate from about 0.2 cps to about 10 cps. The count rate remained constant through introduction of the wash solution into the flow cell, and decreased during elution of the radionuclide, which was carried out using a solution of about 0.05M $HNO_3$. The incremental increase at the beginning of elution is believed to be a result of the geometry of the flow cell, the position of the nuclide within the flow cell, and the non-uniform spatial response of the PMT. It was noted that the radionuclide was loaded at an outer position of the coiled cell where radiant sensitivity of the PMTs is low.

Figure 3:
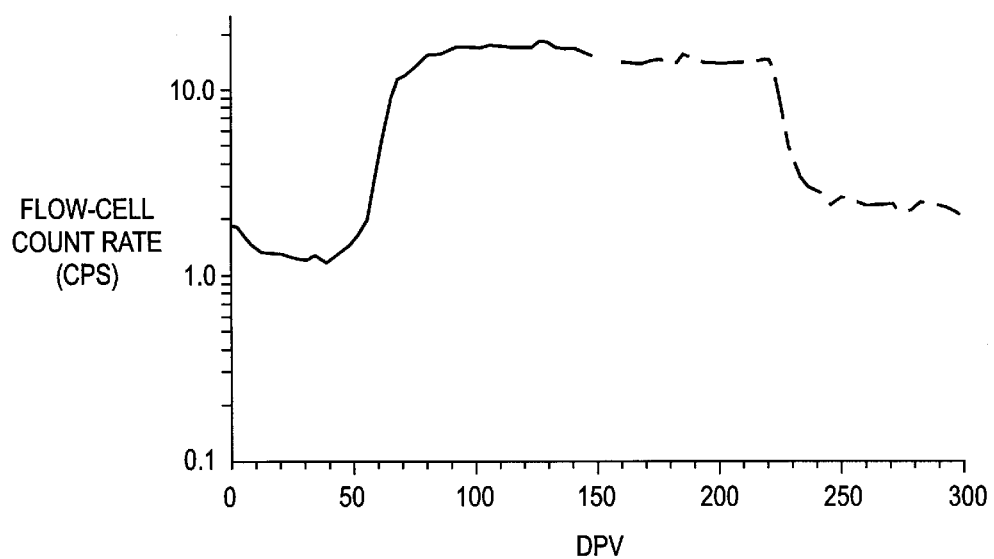
FIG. 3 is a graphic illustration similar to FIG. 2, with the flow cell having a modified geometry and an extraction scintillation medium having modified concentrations of fluors.

FIG. 3 is a plot similar to FIG. 2, in which the flow cell was slightly modified to eliminate the geometry problem observed during the study in which the data of FIG. 2 were developed. In addition, the concentration of the fluors was reduced by a factor of ten; i.e., the PPO concentration was reduced from 7.5 g to 0.75 g per 30 g of support, and the DM-POPOP concentration was reduced from about 1.0 g to about 0.1 g per 30 g of support; in addition, naphthalene was added as an additional fluor. Resins illustrating these concentration are represented as Samples TRU1 and TRU6, respectively, in Table 1.

Figure 4:
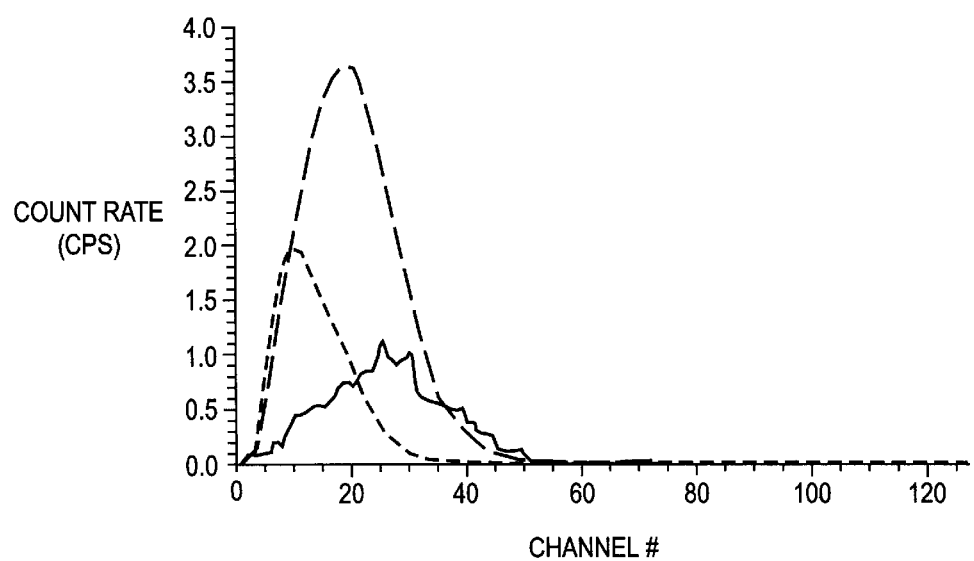
FIG. 4 is a graphic illustration of the pulse height spectra for extraction-scintillation media having three different concentrations of fluors, the spectra being illustrated as the count rate in cps as a function of the sensor channel number (Channel #), the spectrum for the lowest concentration of fluors being shown as a short interval broken line, the spectrum for an intermediate concentration of fluors being shown as a large interval broken line, and the spectrum for the highest concentration of fluors being shown as a solid line.

FIG. 4 is a plot of the pulse height spectra showing the count rate as a function of the multi-analyzer channel number (the significance of which will be discussed in more detail below) for resins having incrementally lower concentrations of fluors, as represented by Samples TRU3, TRU4, and TRU5, respectively in Table 1. The pulse height distribution for TRU1 was essentially identical to that for TRU3. In FIG. 4, the media with the highest concentration of fluors (TRU3) is represented by the solid curve, the media with an intermediate concentration of fluors (TRU4) is represented by the curve formed from a large interval broken line, and the media with the lowest concentration of fluors (TRU5) is represented by the curve formed from a short interval broken line.

As can be seen from FIG. 4, as the concentration of the fluors decreased, the peak pulse height channel number also decreased, indicating that the smaller voltage pulse corresponded to lower luminosity. Essentially, a higher pulse height peak channel number correlates to a higher light output or luminosity. The data thus further indicate that the resin represented by Sample TRU3 provided a desired concentration of fluors. It is noted that the differences in the peak areas for TRU3, TRU4 and TRU5 in FIG. 4 are attributable to various amounts of radioactivity sorbed onto the media.

Off-line studies were carried out using a technetium/iodine-selective extraction-scintillation medium and an actinide-selective extraction-scintillation medium. The technetium/iodine-selective extraction-scintillation medium was based upon the above-presented ABEC® resin impregnated with PPO and DM-POPOP by the methods set forth above. The ABEC® resin-based extraction-scintillation medium was made using a cross-linked polystyrene bead resin, having the PPO and DM-POPOP impregnated therein, to which chains of monomethylated polyethylene glycol having an average molecular weight of 2000 Da were grafted. The actinide-selective extraction-scintillation medium was based upon the above-noted CMPO/TBP (TRU) resin.

In conducting the ABEC®-based medium studies, the resin was rehydrated with deionized distilled water for about thirty minutes, and was slurry packed into an empty ion exchange column to a height of about 4.5 mL, which corresponded to a slurry volume of about 3 cubic centimeters ($cm^3$). The ion exchange column was an Environmental Express, 9 mm inside diameter (ID) column. The resin was preconditioned with 25 mL of 4M NaOH.

A 1.0-mL (0.9897 g) solution of Tc-99 (493.6 Bq/g in 0.1 N $HNO_3$) was diluted with 2.0 mL of 4M NaOH, which yielded a loading solution activity of 488.5 Bq. The loading solution was added to the preconditioned resin in the column and the column was rinsed with 10 mL of 4M NaOH. The loading effluent, which included the loading solution and the rinse solution, was collected for off-line analysis. The Tc-99 loaded ABEC®-based medium column was trimmed to fit into a 7-mL scintillation vial, inserted into the vial and analyzed for four hours using a Wallac 1415 liquid scintillation counter. The sample was analyzed or "counted" for four hours to obtain good counting statistics. A 1.0-mL sample of the loading effluent was mixed with 15 mL of Hi-Safe3 scintillation cocktail (available from EG&G Wallac), dark adapted for one hour and analyzed (counted) for four hours using known liquid scintillation techniques. A second 1.0-mL sample of the loading effluent was analyzed, but was first neutralized with nitric acid, and then mixed with 15 mL of the scintillation cocktail, dark adapted for one hour and analyzed for four hours. The second sample analysis was carried out because of the chemical luminescence resulting from interaction of the NaOH and the cocktail.

A substantially similar procedure was carried out for the actinide-selective extraction-scintillation medium (TRU-based resin) analysis. This resin was not rehydrated, but was dry-packed into the column, and was preconditioned with 25 mL of 4M $HNO_3$. A 1.0-mL solution of Am-241 corresponding to an activity of 60 Bq was loaded onto the column. The loading solution was added to the preconditioned resin in the column and the column was rinsed with 10 mL of 2M $HNO_3$. The loading effluent, which included the loading solution and the rinse solution, was collected for off-line analysis. The Am-241 loaded TRU-based medium column was trimmed to fit into a 7-mL scintillation vial, inserted into the vial and analyzed for four hours using the Wallac 1415 liquid scintillation counter. The sample was analyzed or "counted" for four hours to obtain good counting statistics. A 1.0-mL sample of the loading effluent was mixed with 15 mL of Hi-Safe3 scintillation cocktail, dark adapted for one hour and analyzed (counted) for four hours using known liquid scintillation techniques.

The results of these off-line analyses are illustrated in FIG. 5, which shows the light output; i.e. pulse height spectra, for the columns loaded with ABEC®-based resin and TRU-based resin. In this figure, the count rate per channel (on the left-hand and right-hand ordinates), in counts per minute, is shown as a function of the multianalyzer channel number (on the abscissa). In FIG. 5, the data for the ABEC®-based resin are represented by the open squares, and are shown as a function of the count rate represented by the values shown on the left-hand ordinate of the figure. The data for the TRU-based resin are represented by the open diamonds, and are shown as a function of the count rate represented by the values shown on the right-hand ordinate of the figure. One of the results of this analysis indicates that substantially all of the Tc-99 was loaded onto the column, and that the ABEC®-based resin had an overall detection efficiency of about 36 percent for the 488.5 Bq of Tc-99 loaded onto the column as measured by the liquid scintillation counter.

The capacity factor (k') and minimum detectable concentration (MDC); i.e., the quantification level, were determined for a sensor having a flow cell with a contemplated extraction-scintillation medium. The capacity factor, also referred to as the retention volume, is the affinity that a sorbent material has for a specific metal ion under a given set of conditions. Theoretically, the capacity factor is defined by the following equation:

$$k'=(V-V_m)/V_m=(t-t_m)/t_m,$$

where:

V is the total volume of solution that is passed through the flow cell;

$V_m$ is the pore volume of the flow cell (about 2E-4 L); and t and $t_m$ are the times for the analyte and mobile phase, respectively, to pass through the column.

The capacity factor was determined experimentally, and the MDC was calculated based upon the following relationship between k' and MDC:

$$MDC=[2.71+(4.65(C_{bg}t_mk')^{1/2})]/(\epsilon t_m k'V_m k')$$

where:

$C_{bg}$ is the background count rate of the flow cell detection system (about 0.6 cps); $t_m$ is the mobile phase residence time in the flow cell (about 24 seconds); and $\epsilon$ is the detection efficiency (about 1.0).

As set forth above, k' was experimentally determined, and is defined as the number of displaced pore volumes (DPV) that pass through the flow cell before the effluent concentration reaches a maximum. This is the point at which half of the radioactivity has been removed from the flow cell.

The experimental method for determining k' was similar to that used to determine the loading efficiency and total recovery as discussed above. In determining k', following flow cell conditioning and commencement of data acquisition, a radioactive spike (U-233) along with a conservative tracer (H-3) in an appropriate acid solution; e.g., 2M HNO3 was introduced into the flow cell, in about 1 pore volume. The flow cell was washed with a solution of the same acid that was used to load the radionuclide. The flow cell effluent was collected in about 1 mL aliquots. The elution effluent was counted on a liquid scintillation counter to determine when breakthrough occurred. Following elution of the radionuclide, the multichannel spectrum was saved on the computer. On-line and off-line data were analyzed to determine k'.

Based upon the experimental method, k' was determined to be about 3000 for U-233 and the TRU10 media, as shown in Table 3, with the correspondingly calculated MDC of 0.022 Bq/L, as shown in Table 3, below.

TABLE 3

| MDC AS A FUNCTION OF k' | |
|---|---|
| k' | MDC (Bq/L) |
| 75 | 5.76 |
| 100 | 3.73 |
| 500 | 0.33 |
| 1000 | 0.12 |
| 3000 | 0.022 |
| 5000 | 0.010 |

A contemplated extraction-scintillation medium and sensor system 12 provides on-line, real-time or near real-time detection of selective radionuclides in an aqueous stream, with minimal physical or chemical hold-up of the aqueous sample. Such a medium is highly chemically selective in extraction and is in a free-flowing or substantially free-flowing physical form to facilitate preparation and loading of one or more flow cells for use in the sensor system.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An extraction-scintillation medium comprising substantially free-flowing, porous, solid particulate matter having at least one fluor retained within the particulate matter and an extraction agent adsorbed on the surface of the particulate matter, wherein the medium is capable of selectively extracting one of americium, uranium, thorium, plutonium, neptunium and curium from an acidic aqueous stream, and wherein the medium permits transmission of light therethrough, which light is emitted from the at least one fluor in response to radiation absorbed thereby from the one of americium, uranium, thorium, plutonium, neptunium and curium.

2. The extraction-scintillation medium in accordance with claim 1, wherein the particulate matter is an inert bead resin.

3. The extraction-scintillation medium of claim 2, wherein the bead resin is cross-linked polystyrene.

4. The scintillation medium in accordance with claim 2 wherein the bead resin is an acrylic bead resin.

5. The extraction-scintillation medium of claim 1, including two fluors being a mixture of PPO and DM-POPOP.

6. The extraction-scintillation medium of claim 5 further including naphthalene.

7. The extraction-scintillation medium of claim 5, wherein the PPO is present in a concentration of about 2 percent to about 20 percent by weight of the solid particulate matter and the DM-POPOP is present in a concentration of about 0.3 percent to about 2.6 percent by weight of the solid particulate matter.

8. The extraction-scintillation medium of claim 1, wherein the extraction agent is CMPO in a phase modifier.

9. The extraction-scintillation medium of claim 1, wherein the extraction agent is a crown ether.

10. The extraction-scintillation medium of claim 9, wherein the crown ether is DtBuCH18-C-6.

11. The scintillation medium in accordance with claim 1 wherein the one or more fluors are selected from the group consisting of 1,4-bis-2-(5-phenyloxazol-2-yl)benzene (POPOP), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2-(4-biphenylyl)-6-phenylbenzoxazole (PBBO), 2-(1-napthyl)-5-phenyloxazole (-NPO), 1,4-bis(2-methylstyryl)benzene (bis-MSB), 2,5-bis (5-tert-butyl-2-benzoxazolyl)thiophene (BBOT), anthracene, stilbene, p-terphenyl, 2,7-diphenyl-9,9-dipropylfluorene (PPF), 2,7-bis(4-t-amylphenyl)-9,9-dipropylfluorene (d-amyl-PPF), 2,7-bis(4-methoxyphenyl)-9,9-dipropylfluorene (d-MeO-PPF), and 7,7-diphenyl-9,9,9', 9'-tetrapropy-2,2'-bifluorene ($PF_2$) and naphthalene.

12. An extraction-scintillation medium comprising substantially free-flowing, porous, solid particulate matter having at least one fluor retained within the particulate matter and an extraction agent adsorbed on the particulate matter, the extraction agent having a neutral charge, wherein the medium is capable of extracting one of americium, uranium, thorium, plutonium, neptunium and curium from an acidic aqueous stream, and wherein the medium permits transmission of light therethrough, which light is emitted from the at least one fluor in response to radiation absorbed thereby from the one of americium, uranium, thorium, plutonium, neptunium and curium.

13. The extraction-scintillation medium of claim 12 wherein the extraction agent is a diphosphonic acid-based extractant.

14. The extraction-scintillation medium of claim 12, wherein the extraction agent is a diesterified methanediphosphonic acid.

15. The extraction-scintillation medium of claim 14, wherein the diesterified methanediphosphonic acid is bis(2-ethylhexyl)methanediphosphonic acid in a diluent of methanol.

16. A detector for providing real-time or near real-time retention and counting of a selected actinide from an acidic aqueous stream comprising:

a flow cell;

an extraction-scintillation medium disposed in the flow cell, the-scintillation-extraction medium comprising substantially free-flowing, porous, solid particulate matter having one or more fluors retained within the particulate matter and an extraction agent adsorbed on the surface of the particulate matter, wherein the medium is capable of extracting the selected actinide from the acidic aqueous stream, and wherein the medium permits transmission of light therethrough, which light is emitted from the one or more fluors in response to radiation absorbed thereby from the selected actinide; and means for detecting the light emitted from the one or more fluors.

17. A detector for providing real-time or near real-time retention and counting of a selected actinide from an acidic aqueous stream comprising:

a flow cell;

an extraction-scintillation medium disposed in the flow cell, the scintillation-extraction medium comprising substantially free-flowing, porous, solid particulate matter having one or more fluors retained within the particulate matter and an extraction agent adsorbed on the surface of the particulate matter, wherein the medium is capable of extracting the selected actinide from the acidic aqueous stream, and wherein the medium permits transmission of light therethrough, which light is emitted from the one or more fluors in response to radiation absorbed thereby from the selected actinide;

at least one photomultiplier tube positioned adjacent the flow cell for sensing the light emitted from the extraction-scintillation medium, and generating an electrical signal in response thereto; and a recording apparatus operably connected to the at least one photomultiplier tube for recording the electrical signal generated thereby.

* * * * *